United States Patent Office 3,122,516
Patented Feb. 25, 1964

3,122,516
ORGANOSILOXANE ELASTOMERS REINFORCED WITH MODIFIED SILICA FILLERS
Keith E. Polmanteer, Midland, Mich., assignor to Dow Corning Corporation, Midland, Mich., a corporation of Michigan
No Drawing. Filed Feb. 20, 1961, Ser. No. 90,224
11 Claims. (Cl. 260—37)

This invention relates to the art of incorporating certain modified silica fillers into otherwise conventional siloxane rubber formulations. These siloxane elastomers have improved retention of tensile strength at temperatures of 250° C. and above, i.e. improved "hot strength."

Silicone rubber is now a well-known article of commerce. It is available in a wide variety or different types and has been prepared from a host of different organosiloxane polymers or copolymers with various fillers and curing catalysts. Silicone rubber is well known for its exceptional thermal stability and its retention of desired physical properties after exposure to elevated temperatures. In the past, however, even the best of the silicone rubbers suffered a drastic loss in tensile strength when tested at elevated temperatures (i.e. 250° C. and above). In other words, the silicone rubber of the prior art has been deficient in "hot strength." Thus even though a silicone rubber sample retained its tensile strength when measured at room temperature after prolonged thermal exposure, it would be found to be greatly weakened when measured at elevated temperatures.

It is a primary object of this invention to provide an improved organosiloxane rubber, and particularly to provide a rubber having improved tensile strength at elevated temperatures. It is also the object of this invention to obtain these improved high temperature properties without seriously impairing the room temperature properties of the elastomer.

It has been found that a great improvement in the high temperature strength of silicone rubber can be obtained by incorporating certain modified silica fillers into otherwise conventional silicone rubber formulations. Thus this invention relates to an organosiloxane rubber stock comprising an intimate mixture of an (1) organopolysiloxane convertible to the cured, solid, elastic state which has an average of at least 800 silicon atoms per molecule, said siloxane consisting essentially of units of the formula

where R is selected from the group consisting of methyl, phenyl, vinyl and perfluoroalkyl radicals of the formula $C_yF_{2y+1}CH_2CH_2$ where $y$ has a value of from 1 to 10 inclusive, with $n$ having an average value of from 1.98 to 2.05, in which siloxane at least 30% of the total number of R groups are methyl radicals and no more than 0.5% of the total number of R groups are vinyl radicals and (2) a modified silica filler comprising finely divided hydrophobic solid particles having a surface area of at least 150 m.$^2$/g., each of said particles consisting essentially of a polymeric siliceous substrate consisting essentially of from 50 to 100 inclusive mol percent of units (A) of the formula $SiO_2$ and from 0 to 50 inclusive mol percent of units (B) of the formula $R'SiO_{1.5}$ where $R'$ is an alkyl radical of less than 6 C atoms, there being units (C) of the formula

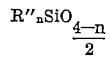

and units (D) of the formula

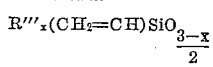

chemically bonded through siloxane linkages to different silicon atoms in the surface of said substrate in amount such that there are from 4 to 29.9 inclusive (C) units and from 0.1 to 2 inclusive (D) units per 100 total (A) and (B) units and from 6 to 30 inclusive total (C) and (D) units per 100 total (A) and (B) units and sufficient total (C) and (D) units, within the above limits, to saturate the surface of the substrate with organosilyl units, in the said (C) and (D) units $n$ being an integer of from 2 to 3 inclusive, $x$ being an integer of from 1 to 2 inclusive, R″ being selected from the group consisting of methyl, phenyl and 3,3,3-trifluoropropyl radicals and R‴ being selected from the group consisting of alkyl radicals of from 1 to 5 inclusive carbon atoms, phenyl and 3,3,3-trifluoropropyl radicals.

This invention is also particularly concerned with the organosiloxane rubber which is obtained when the above described rubber stock is cured or "vulcanized." The term "rubber stock" is used herein to refer to the uncured mixture from which the final rubbery product can be obtained.

The organopolysiloxanes that can be used herein must have an average of at least 800 silicon atoms per molecule. Such siloxanes would have a viscosity of 10,000 cs. at 25° C. or above. Thus, they could be nonflowing gums. There must be an average of from 1.98 to 2.05 inclusive organic radicals attached to silicon per silicon atom. The above described siloxanes can contain relatively minor amounts of monoorgano- or triorganosiloxane units, such as those of the formulae $RSiO_{1.5}$ and $R_3SiO_{.5}$ where R is any of the previously described organic radicals. Such units can only be present in relatively minor amounts so that the average degree of substitution of from 1.98 to 2.05 inclusive organic radicals per silicon atom is maintained. As is well known in the art, it is often highly advantageous to employ triorganosiloxane end-blocked polymers, such as those end-blocked with trimethylsiloxy or dimethylvinylsiloxy units.

In order to obtain the improved hot strength of this invention, it is essential to use organopolysiloxanes that are thermally stable at 250° C. and above. Therefore, the siloxanes must consist essentially of units of the formula

where R is selected from the group consisting of methyl, phenyl, vinyl and perfluoroalkyl radicals of the formula $C_yF_{2y+1}CH_2CH_2$ where $y$ has a value of from 1 to 10 inclusive. Obviously, the siloxane can be a copolymer of two or more of the above described siloxanes. Examples of suitable perfluoroalkyl radicals are $CF_3CH_2CH_2$, $C_3F_7CH_2CH_2$, $C_7H_{15}CH_2CH_2$ and $C_{10}F_{21}CH_2CH_2$. Since the siloxane "consists essentially of" units of the above formula, other organic radicals may be present in the siloxane. However, these radicals can only be present in very small quantities, so that the heat stability of the siloxane is not seriously impaired. These organic radicals can be any of those that are typically present in siloxane gums.

At least 30% of the organic groups in the organopolysiloxane must be methyl and no more than 0.5% can be vinyl radicals. It is preferred that the organopolysiloxane contain at least 50 mol percent of units of the formula $(CH_3)_2SiO$ and preferably at least 85 mol percent of such units with the remaining units being $(C_6H_5)_2SiO$, $C_yF_{2y+1}CH_2CH_2$ and not more than 1 mol percent $(CH_3)(CH_2=CH)SiO$. Best results are obtained from those polymers which contain from 99 to 99.95 inclusive mol percent $(CH_3)_2SiO$ units and from 0.05 to 1 inclusive mol percent of $(CH_3)(CH_2=CH)SiO$ units.

The most important feature of this invention resides in the particular modified silica fillers which are employed. It has been known for some time that various pigments, such as carbon blacks and silica, could be treated with alkyl alkenyl chlorosilanes in order to chemically link the organosilyl units to the surface of the pigment. The following Te Grotenhuis patents disclose such treatments: U.S. Patents 2,610,167; 2,742,378; 2,751,369. The improved hot strength obtained in this invention cannot be obtained with an elastomer which contains a silica filler treated with alkylvinylsilanes. This is true regardless of the amount of alkylvinylsilyl units that are attached to the surface of the silica. If the surface of the silica is "saturated" with alkylvinylsilyl units, the elastomer is hard and brittle. If less than this amount is used, the rubber stock will harden unless it is vulcanized immediately after it is made.

U.S. Patent 2,863,846 teaches the use in siloxane elastomers of reinforcing fillers having alkylsilyl units, attached through siloxane linkages to silicon atoms in the surface of the silica. Following the teachings of the instant invention improves the "hot strength" well over values obtained with only alkylsilyl units attached to the surface of the silica (see Examples 1 and 2). This holds true regardless of the amount or kind of alkylsilyl units that are present.

The improved hot strength of this invention is a synergistic effect which is obtained when the reinforcing fillers contain a specified range of vinyl substituted silyl units attached through siloxane linkages to a specific portion of the silicon atoms in the surface of the silica substrate and these vinyl substituted silyl units are present within the specified proportions as related to the methyl and/or phenyl and/or trifluoropropyl substituted silyl units which are also attached through siloxane linkages to a specific portion of the silicon atoms in the surface of the modified silica. There also must be sufficient total vinyl, alkyl, phenyl and 3,3,3-trifluoropropyl substituted organosilyl units present to saturate the surface of the substrate. The term "saturate" means that essentially all the reactive sites (presumably SiOH groups) on the surface of the silica substrate have been covered with silyl groups.

The precise amount of organosilyl groups needed to "saturate" the surface of the substrate will depend on the type of filler, surface area of the filler, type of treatment of the filler and numerous other factors. If the surface of the substrate is not "saturated," the uncured rubber in which the filler is incorporated is likely to harden and become unworkable, if there is any delay in vulcanizing the stock. It is believed that this "crepe aging" is caused by excessive crosslinking between the polymer chains and the filler particles which is brought about by interaction of the polymer with the exposed reaction sites on the surface of the substrate. The amount of organosilyl groups that are needed to saturate the filler will vary from 6 to 30 inclusive total organosilyl groups per 100 total $SiO_2$ and $R'SiO_{1.5}$ groups in the substrate.

The surface area of the filler is also quite critical and must be at least 150 square meters per gram as measured by nitrogen adsorption with the method described in ASTM Special Technical Bulletin No. 51, page 95 et seq. (1941). The improved "hot tensile strength" is not attained if fillers below 150 square meters per gram are used. The preferred surface area is between 300 and 400 square meters per gram. There is no critical maximum for the silica surface area, which can be 900 square meters per gram or more.

The modified silica fillers can be prepared from any reinforcing silica filler having a surface area of at least 150 square meters per gram (e.g. fume silicas, silica aerogel, hydrogels, organogels and xerogels). The fillers can be prepared from fillers that are composed of all $SiO_2$ units or they may be composed of from 50 to 100 mol percent $SiO_2$ and 0 to 50 mol percent $R'SiO_{1.5}$ where $R'$ is an alkyl radical of less than 6 C atoms. Thus $R'$ could be methyl, ethyl, propyl, butyl or pentyl radicals. If $R'SiO_{1.5}$ units are present these fillers are commonly called cogels. The methods of making these cogels are well known in the art.

The surfaces of these fillers are saturated with organosilyl groups of the formula $$R''_n SiO_{\frac{4-n}{2}}$$

and $$R'''_x(CH_2=CH)SiO_{\frac{3-x}{2}}$$

which groups are bonded to the silica surface by SiOSi linkages and in which $R''$ is selected from the group consisting of methyl, phenyl and 3,3,3-trifluoro-propyl and $R'''$ is selected from the group consisting of alkyl radicals of from 1 to 5 inclusive carbon atoms, phenyl and 3,3,3-trifluoropropyl radicals and in which $x$ is an integer of from 1 to 2 inclusive and $n$ is an integer of from 2 to 3 inclusive. These organosilyl groups must be attached to the substrate in the specified proportions and in sufficient quantity to saturate the surface. These fillers can be prepared by any suitable method.

One suitable method is to prepare a finely divided silica such as one may obtain by burning a volatile silane and thereafter treat the silica with a reactive organosilicon compound which will provide the specified range and kinds of organosilyl units attached to the surface of the silica substrate. Chlorosilanes, silanols and alkoxysilanes, which will provide the proper kinds of organosilyl units, may be used to treat the substrate.

A second method is that of reacting a silica hydrogel or organogel with the proper reactive organosilicon compounds. In general, this method entails precipitating silica from an alkali metal silicate solution to form a silica hydrogel and thereafter treating the gel with a reactive organosilane or organosiloxane compound such as a chlorosilane, silanol, alkoxysilane or a siloxane. When a siloxane is employed, treatment should be carried out under acidic conditions which insure complete reaction of the organosilicon compound with the silica.

The vinyl substituted silyl units attached to the substrate may be obtained by treating the substrate with an alkoxysilane, silanol, chlorosilane or siloxane of the formula $$R'''_x(CH_2=CH)SiY_{\frac{3-x}{2}}$$

and where $Y$ is either an oxygen atom or a hydrolyzable group and $R'''$ is as previously defined. The $R''$ substituted silyl units may be obtained by treating the substrate with a methyl and/or phenyl and/or trifluoropropyl containing chlorosilane, silanol, alkoxysilane or siloxane.

The $R''$ substituted silyl units which are attached to the silica van be any group of the formula $$R''_n SiO_{\frac{4-n}{2}}$$

in which $R''$ is selected from the group consisting of methyl, phenyl and 3,3,3-trifluoropropyl radicals. In this invention $n$ has a value of from 2 to 3 inclusive. Thus, the silica can be coated with diorganosilyl groups, triorganosilyl groups or mixtures of such groups with or without limited amounts of monoorganosilyl groups. For example, $$R''_n SiO_{\frac{4-n}{2}}$$

can be dimethylsilyl or trimethylsilyl groups or a combination thereof, or a combination of trimethylsilyl and monomethylsilyl groups.

The vinyl substituted silyl units which are attached to the silica can be any group of the formula $$R'''_x(CH_2=CH)SiO_{\frac{3-x}{2}}$$

where R''' is selected from the group consisting of alkyl radicals of from 1 to 5 inclusive, phenyl and 3,3,3-trifluoropropyl radicals, $x$ has a value of from 1 to 2 inclusive. Thus, these silyl units can be diorganosilyl groups or triorganosilyl groups or mixtures of such groups. For example, $$R'''_x(CH_2=CH)SiO_{\frac{3-x}{2}}$$

can be dimethylvinylsilyl or methylvinylsilyl groups or a combination thereof. The previously described proportions of R'' substituted silyl units to vinyl substituted silyl units and the proportions of these silyl units to $SiO_2$ are quite critical in obtaining the improved "hot strength." Fewer than .1 or more than 2 vinylsilyl units per 100 total $SiO_2$ and $R'SiO_{1.5}$ will not increase the hot strength over that of conventional siloxanes.

From 20 to 100 parts by weight of filler per 100 parts of polysiloxane gum must be used to achieve the improved "hot strength." Depending on the particular filler used, best results are obtained when 45 to 90 parts of filler are used. The filling power of these fillers will vary depending on such factors as particle size and degree of agglomeration. The amount of filler that is used will also depend upon the polymer that is used. In general, the viscosity of the polymer and the desired amount of filler are in an inverse ratio to each other.

The compositions of this invention can contain other additives such as compression set additives, oxidation inhibitors, thermal stabilizers, plasticizers, pigments and other materials, commonly employed in organosilicon rubbers. Care must be taken, however, that these additives be at least as heat stable as the base composition.

The compositions of this invention are cured simply by heating at a temperature above the decomposition point of the peroxide vulcanizing agent. This is a conventional technique in the art. Examples of operative organic peroxides include benzoyl peroxide, tertiary butyl perbenzoate, dicumylperoxide, di-t-butylperoxides, tertiary butyl peracetate and 2,5-dimethyl-2,5-di-t-butylperoxyhexane. These peroxides can be used in amounts ranging from 0.1 to 10 parts by weight per 100 parts of the siloxane.

The compositions of this invention give rubbers having tensile strengths at elevated temperature, which are superior to those possessed by conventional silicon elastomers.

The compositions of this invention can be used any place where conventional siloxane elastomers can be used. These elastomers are especially useful in places where conventional siloxane elastomers are unsatisfactory because of lack of sufficient "hot strength." The following examples are illustrative only and should not be construed as limiting the invention which is properly delineated in the appended claims. The tests for tensile strength were made while the sample was at the testing temperature and after 15 to 30 minutes exposure to that temperature.

EXAMPLE 1

In this example, the high temperature strengths of a siloxane rubber containing a treated silica xerogel filler are compared with the strengths of a rubber which is identical except that it contains a silica xerogel filler treated in accordance with this invention.

A dimethylvinylsiloxane endblocked gum composed of .142 mol percent methylvinylsiloxane, 92.358 mol percent dimethylsiloxane and 7.5 mol percent phenylmethylsiloxane was prepared.

Sample I was prepared by mixing 100 grams of the above gum with 2 grams di-t-butylperoxide and 60 grams of a treated silica xerogel with an average surface area of at least 300 square meters per gram. This treated xerogel was prepared by transforming sodium silicate in solution to a silica sol in presence of an ion exchange resin. 600 cc. of this sol were refluxed for 1 hour. Then 300 cc. of hydrochloric acid and 1.5 g. of $FeCl_3$ were added and the mixture was refluxed for 3 hours. 300 cc. of isopropanol were than added, followed by 40 cc. of trimethylchlorosilane. After 30 minutes, 750 cc. of n-heptane were added. The water, alcohol and unreacted silanes were then removed from the gel and the gel was dried. The resulting treated xerogel has an average surface area of at least 300 square meters per gram. The surface of the substrate is saturated with organosilyl units attached through siloxane linkages to silicon atoms in the surface.

Sample II was prepared by mixing 100 grams of the above gum with 2 grams di-t-butylperoxide and 60 grams of a treated silica xerogel with a surface area of at least 300 square meters per gram and which has .002 mole of methylvinylsilyl units per mol of $SiO_2$, bonded through siloxane linkages to different silicon atoms in the surface of the substrate. This treated xerogel is prepared in the same way as the one described in sample I, except that .236 cc. of methylvinyldichlorosilane were added after the isopropanol was added. The mixture was then stirred for 30 minutes before the trimethylchlorosilane was added. The surface of the silica was saturated with organosilyl units.

Both samples were press vulcanized for 10 minutes at 168° C. and then aftercured for 6 hours at 250° C. The tensile strength T (p.s.i.) was then measured. The percent elongation at break of both samples was in excess of 100 at 250° C.

Table I

| Testing Temperature | Sample | |
| --- | --- | --- |
| | I | II |
| | T | T |
| 200° C. | 600 | 680 |
| 250° C. | 410 | 563 |

Equivalent results are obtained when any of the following curing catalysts are substituted for the di-t-butylperoxide of sample II in an amount to give a similar degree of cross-linking; benzoyl peroxide, tertiarybutylperbenzoate, tertiarybutylperacetate, di-cumylperoxide and 2,5-dimethyl-2,5-di-t-butylperoxide-hexane.

When the amount of filler in sample II is increased to 90 grams, a siloxane elastomer of high tensile strength at elevated temperatures is obtained.

EXAMPLE 2

In this example, the high temperature strengths of a siloxane rubber containing a treated silica xerogel filler are compared with the strengths of a rubber which is identical except that it contain a silica xerogel filler treated in accordance with this invention.

A dimethylsilanol endblocked gum composed of .142 mol percent methylvinylsiloxane and 99.858 mol percent dimethylsiloxane was prepared.

Sample I was prepared by mixing 100 grams of the above gum with 2 grams di-t-butylperoxide and 60 grams of a treated silica xerogel with a surface area of at least 300 square meters per gram. This xerogel was prepared by refluxing 900 cc. of a silica sol for 90 minutes. 400 ml. of HCl and 3.8 grams of $FeCl_3$ were added and the mixture refluxed for 3 hours. 680 cc. of isopropanol were then added and stirred for 1 hour. 56 cc. of trimethylchlorosilane were then added and the mixture stirred for 30 minutes. 1100 cc. of toluene were added. The toluene, acid, alcohol and unreacted silane were then separated from the filler. The filler was then air dried. The surface area of the silica was saturated with trimethylsilyl units.

Sample II was prepared by mixing 100 grams of the above gum with 2 grams di-t-butylperoxide and 60 grams of a silica xerogel with a surface area of at least 300 square meters per gram and which has .01 mole of dimethylvinylsilyl units per mol of SiO$_2$ bonded through siloxane linkages to the different silicon atoms in the surface of the substrate. This xerogel was modified in the same manner as the one described in sample I, except that 1.6 cc. of dimethylvinylchlorosilane were added after the isopropanol was added. The mixture was then stirred for one hour before the trimethylchlorosilane was added.

Sample III was prepared in the same manner as sample II, except that the amount of dimethylvinylchlorosilane was increased to 3.2 cc. This filler contained .02 mole of dimethylvinylsilyl units per mol of SiO$_2$. The surface of the substrate was saturated with organosilyl units. The remaining organosilyl units, which are necessary to saturate the surface, are trimethylsilyl units.

The samples were press vulcanized for 10 minutes at 168° C. and then aftercured for 6 hours at 250° C. The tensile strength (p.s.i.) was then measured. The percent elongation at break of all samples was in excess of 40 at all temperatures.

Table II

| Testing Temperature | Sample | | |
|---|---|---|---|
| | I | II | III |
| | T | T | T |
| 200° C | 660 | 630 | 655 |
| 250° C | 480 | 570 | 660 |
| 300° C | 334 | 486 | 400 |

When the amount of filler used in sample II is decreased to 30 parts by weight, a siloxane elastomer of high tensile strength at elevated temperatures is obtained.

EXAMPLE 3

60 grams of a reinforcing fume silica having a surface area of about 400 square meters per gram were mixed with 440 grams of toluene. 2.26 grams (.01 mole per mole SiO$_2$) of diphenylvinylsilanol and .45 gram of n-hexylamine were added to this mixture. This mixture was agitated for 15 minutes while being refluxed. 21.4 grams of diphenylmethylsilanol were then added to the mixture. The mixture was then refluxed to azeotrope off the n-hexylamine and toluene. The surface of this filler is saturated with organosilyl units. When 60 grams by weight of this filler are substituted for the filler used in sample II, Example 2, a siloxane rubber having excellent tensile strength at elevated temperatures is obtained.

EXAMPLE 4

When 100 mol percent dimethylsiloxane is substituted for the gum in sample II, Example 1, and vulcanized with 2 grams of tertiary butyl perbenzoate instead of ditertiary butyl peroxide, a rubber with excellent tensile strength at high temperatures is obtained.

EXAMPLE 5

When 100 grams of any of the following gums are substituted for the organopolysiloxane gum of sample II, Example 1, a siloxane elastomer with high "hot strength" results:

(1) 5 mol percent diphenylsiloxane, 95 mol percent dimethylsiloxane and 2 grams of tertiary butyl perbenzoate are substituted for the di-t-butyl peroxide.

(2) 99 mol percent phenylmethylsiloxane and 1 mol percent methylvinylsiloxane.

(3) 99.5 mol percent (CF$_3$CH$_2$CH$_2$)(CH$_3$)SiO and 0.5 mol percent methylvinylsiloxane.

(4) 20 mol percent diphenylsiloxane, 79.5 mol percent phenylmethylsiloxane and .5 mol percent methylvinylsiloxane.

(5) 99.5 mol percent (CF$_3$CF$_2$CH$_2$CH$_2$)(CH$_3$)SiO and .5 mol percent (CH$_3$)(CH$_2$=CH)SiO.

(6) 99.5 mol percent (C$_7$F$_{15}$CH$_2$CH$_2$)(CH$_3$)SiO and .5 mol percent (CH$_3$)(CH$_2$=CH)SiO.

(7) 99.5 mol percent (C$_{10}$F$_{21}$CH$_2$CH$_2$)(CH$_3$)SiO and .5 mol percent (CH$_3$)(CH$_2$=CH)SiO.

EXAMPLE 6

When any of the following siloxanes are substituted mol per mol for the methylvinylsiloxane attached to the silica substrate in sample II, Example 1, a siloxane rubber with excellent high temperature properties results: phenylvinylsiloxane, dimethylvinylsiloxane, butylvinylsiloxane, ethylvinylsiloxane, diethylvinylsiloxane, methylphenylvinylsiloxane, methylethylvinylsiloxane, methylpropylvinylsiloxane, 3,3,3-trifluoropropylvinylsiloxane and 3,3,3-trifluoropropylmethylvinylsiloxane.

EXAMPLE 7

When any of the following siloxanes are substituted mol per mol for the trimethylsilyl units attached to the silicon substrate in sample II, Example 1, a siloxane rubber with excellent high temperature properties results: dimethylsiloxane, phenylmethylsiloxane, 3,3,3-trifluoropropylmethylsiloxane, 3,3,3 - trifluoropropyldimethylsiloxane and phenyldimethylsiloxane.

EXAMPLE 8

When a filler prepared by the following method is substituted at a filler loading of 35 parts per 100 parts polymer for the filler used in sample II, Example 1, an elastomer with excellent "hot strength" is obtained: 61.4 grams of a cogel having an average surface area of about 700 square meters per gram composed of 80 mol percent SiO$_2$ and 20 mol percent CH$_3$SiO$_{1.5}$ is stirred for 1 hour with 230 ml. of isopropyl alcohol and 165 ml. of 38 percent hydrochloric acid, 9 grams of dimethyldichlorosilane, 1 gram of methylvinyldichlorosilane are added and the mixture is stirred for 1½ hours. The layers are separated and the organic layer is evaporated to dryness. The resulting modified organogel is heated for 40 hours at 110° C. The resulting material is a powder having (CH$_3$)$_2$SiO and CH$_3$(CH$_2$=CH)SiO units attached through siloxane units to different silicon atoms so that the surface of the substrate is saturated with organosilyl units. The filler has a surface area of about 700 square meters per gram.

When a cogel composed of 50 mol percent SiO$_2$ and 50 mol percent CH$_3$SiO$_{1.5}$ is treated by the above method and substituted at a filler loading of 35 parts per 100 parts of polymer for the filler used in sample II, Example 1, an elastomer with excellent "hot strength" is obtained.

That which is claimed is:

1. An organosiloxane rubber stock consisting essentially of an intimate mixture of an (1) organopolysiloxane convertible to the cured, solid, elastic state which has an average of at least 800 silicon atoms per molecule, said siloxane consisting essentially of units of the formula

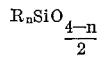

where R is selected from the group consisting of methyl, phenyl, vinyl and perfluoroalkyl radicals of the formula C$_y$F$_{2y+1}$CH$_2$CH$_2$ where $y$ has a value of from 1 to 10 inclusive, with $n$ having an average value of from 1.98 to 2.05, in which siloxane at least 30 percent of the total number of R groups are methyl radicals and no more than 0.5 percent of the total number of R groups are vinyl radicals and (2) a modified silica filler comprising finely divided hydrophobic solid particles having a surface area of at least 150 m.$^2$/g., each of said particles consisting essentially of a polymeric siliceous substrate consisting essentially of from 50 to 100 inclusive mol percent of units (A) of the formula SiO$_2$ and from 0 to 50 inclusive mol percent of units (B) of the formula R'SiO$_{1.5}$ where R' is an alkyl radical of less than 6 carbon atoms, there being units (C) of the formula $$R''_nSiO_{\frac{4-n}{2}}$$

and units (D) of the formula $$R'''_x(CH_2=CH)SiO_{\frac{3-x}{2}}$$

chemically bonded through siloxane linkages to different silicon atoms in the surface of said substrate in amount such that there are from 4 to 29.9 inclusive (C) units and from 0.1 to 2 inclusive (D) units per 100 total (A) and (B) units and from 6 to 30 inclusive total (C) and (D) units per 100 total (A) and (B) units and sufficient total (C) and (D) units, within the above limits, to saturate the surface of the substrate with organosilyl units, in the said (C) and (D) units, $n$ being an integer of from 2 to 3 inclusive, $x$ being an integer of from 1 to 2 inclusive, R'' being selected from the group consisting of methyl, phenyl and 3,3,3-trifluoropropyl radicals and R''' being selected from the group consisting of alkyl radicals of from 1 to 5 inclusive carbon atoms, phenyl and 3,3,3-trifluoropropyl radicals.

2. An organosiloxane rubber which is the cured, solid elastic product of the rubber stock of claim 1.

3. A heat curable composition of matter comprising the organosiloxane rubber stock of claim 1 and an organic peroxide catalyst.

4. An organosiloxane rubber stock in accordance with claim 1 wherein the modified silica filler is present in an amount of from 20 to 100 parts by weight per 100 parts of the organopolysiloxane.

5. An organosiloxane rubber stock in accordance with claim 1 wherein the modified silica filler is present in an amount of from 20 to 100 parts by weight per 100 parts of the organopolysiloxane, with the particles having a surface area of from 300 to 700 m.$^2$/g.

6. An organosiloxane rubber stock consisting essentially of an intimate mixture of an (1) organopolysiloxane convertible to the cured, solid, elastic state and which has an average of at least 800 silicon atoms per molecule, said siloxane consisting essentially of units of the formula $$R_nSiO_{\frac{4-n}{2}}$$

where R is selected from the group consisting of methyl, phenyl, vinyl and perfluoroalkyl radicals of the formula C$_y$F$_{2y+1}$CH$_2$CH$_2$ where $y$ has a value of from 1 to 10 inclusive with $n$ having an average value of from 1.98 to 2.05, in which siloxane at least 30 percent of the total number of R groups are methyl radicals and no more than 0.5 percent of the total number of R groups are vinyl radicals, and (2) from 20 to 100 parts by weight per 100 parts of (1) of a modified silica filler comprising finely divided hydrophobic solid particles having a surface area of from 300 to 700 m.$^2$/g., each of said particles consisting essentially of a polymeric siliceous substrate consisting essentially of SiO$_2$ units, there being units (C) of the formula $$R''_nSiO_{\frac{4-n}{2}}$$

and units (D) of the formula $$R'''_x(CH_2=CH)SiO_{\frac{3-x}{2}}$$

chemically bonded through siloxane linkages to different silicon atoms in the surface of said substrate in amount such that there are from 4 to 29.9 inclusive (C) units and from 0.1 to 2 inclusive (D) units and there being from 6 to 30 inclusive total (C) and (D) units per 100 SiO$_2$ units and sufficient total (C) and (D) units, within the above limits, to saturate the surface of the substrate with organosilyl units, in the said (C) and (D) units $n$ being an integer of from 2 to 3 inclusive, $x$ being an integer of from 1 to 2 inclusive, R'' being selected from the group consisting of methyl, phenyl and 3,3,3-trifluoropropyl radicals and R''' being selected from the group consisting of alkyl radicals of from 1 to 5 inclusive carbon atoms, phenyl and 3,3,3-trifluoropropyl radicals.

7. An organosiloxane rubber which is the cured, solid, elastic product of the rubber stock of claim 6.

8. A heat curable composition of matter comprising the organosiloxane rubber stock of claim 6 and an organic peroxide catalyst.

9. An organosiloxane rubber stock consisting essentially of an intimate mixture of an (1) organopolysiloxane convertible to the cured, solid, elastic state and having an average of at least 800 silicon atoms per molecule, said siloxane consisting essentially of from 99 to 99.95 inclusive mol percent of units of the formula (CH$_3$)$_2$SiO and from 1 to 0.05 mol percent units of the formula CH$_3$(CH$_2$=CH)SiO, and (2) from 20 to 100 parts by weight based on the weight of (1) of a modified silica filler comprising finely divided hydrophobic solid particles having a surface area of from 300 to 700 m.$^2$/g., each of said particles consisting essentially of a siliceous substrate consisting essentially of from 50 to 100 inclusive mol percent of units (A) of the formula SiO$_2$ and from 0 to 50 inclusive mol percent of units (B) of the formula CH$_3$SiO$_{1.5}$, there being units (C) of the formula (CH$_3$)$_3$SiO$_{.5}$ and units (D) of the formula $$(CH_3)_z(CH_2=CH)SiO_{\frac{3-z}{2}}$$

being an integer of 1 to 2 inclusive, chemically bonded through siloxane linkages to different silicon atoms in the surface of said substrate in amount such that there are from 10 to 20 inclusive (C) units and from 0.5 to 2 inclusive (D) units per 100 total (A) and (B) units and sufficient total (C) and (D) units, within the above limits, to saturate the surface of the substrate with organosilyl units.

10. An organosiloxane rubber which is the cured, solid, elastic product of the rubber stock of claim 9.

11. A heat curable composition of matter, consisting of the organosiloxane rubber stock of claim 9 and an organic peroxide catalyst.

References Cited in the file of this patent

UNITED STATES PATENTS

| 2,897,869 | Polmanteer | Aug. 4, 1959 |
| 2,967,168 | Hurd | Jan. 3, 1961 |
| 2,993,809 | Bueche et al. | July 25, 1961 |

UNITED STATES PATENT OFFICE
CERTIFICATE OF CORRECTION

Patent No. 3,122,516 February 25, 1964

Keith E. Polmanteer

It is hereby certified that error appears in the above numbered patent requiring correction and that the said Letters Patent should read as corrected below.

Column 7, line 18, after "strength" insert -- T --; column 10, line 43, before "being" insert -- z --, in italics.

Signed and sealed this 8th day of December 1964.

(SEAL)
Attest:

ERNEST W. SWIDER
Attesting Officer

EDWARD J. BRENNER
Commissioner of Patents